Patented Sept. 20, 1938

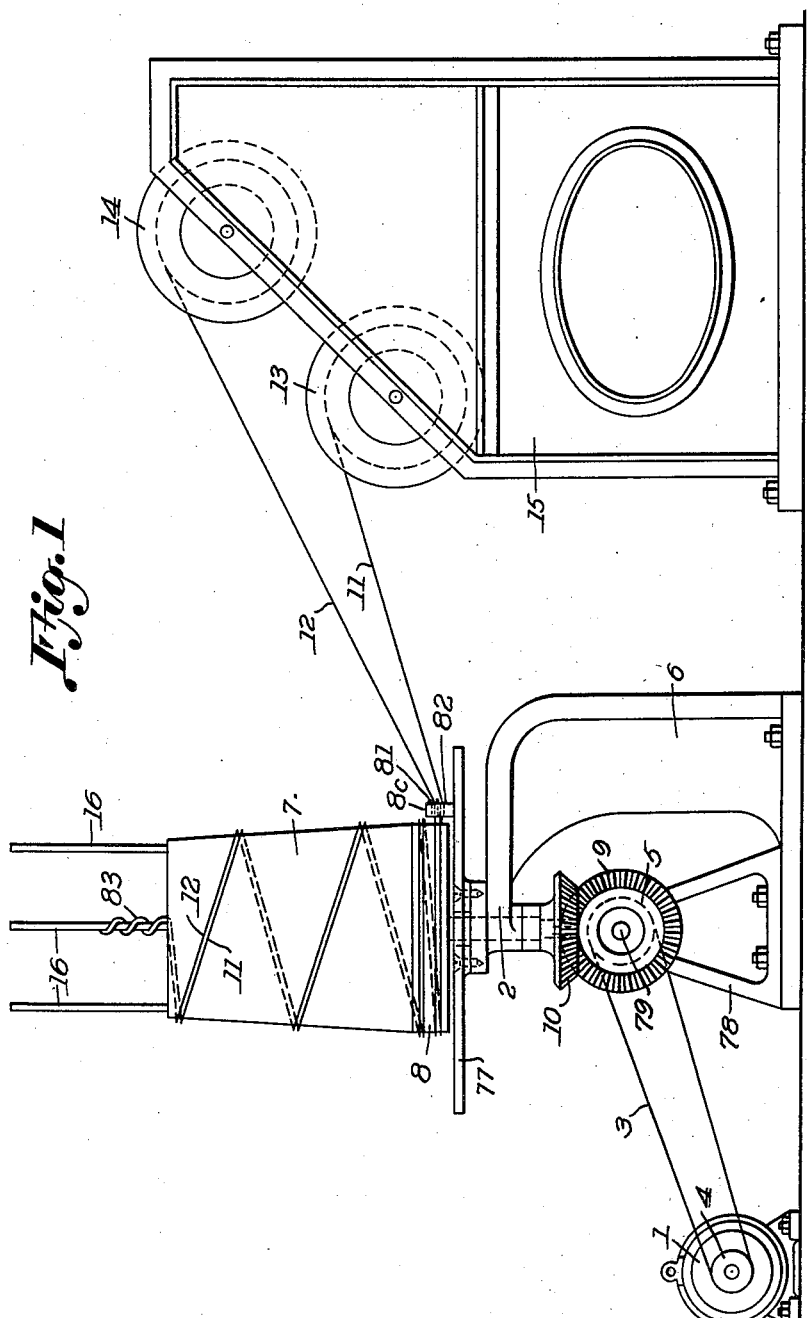

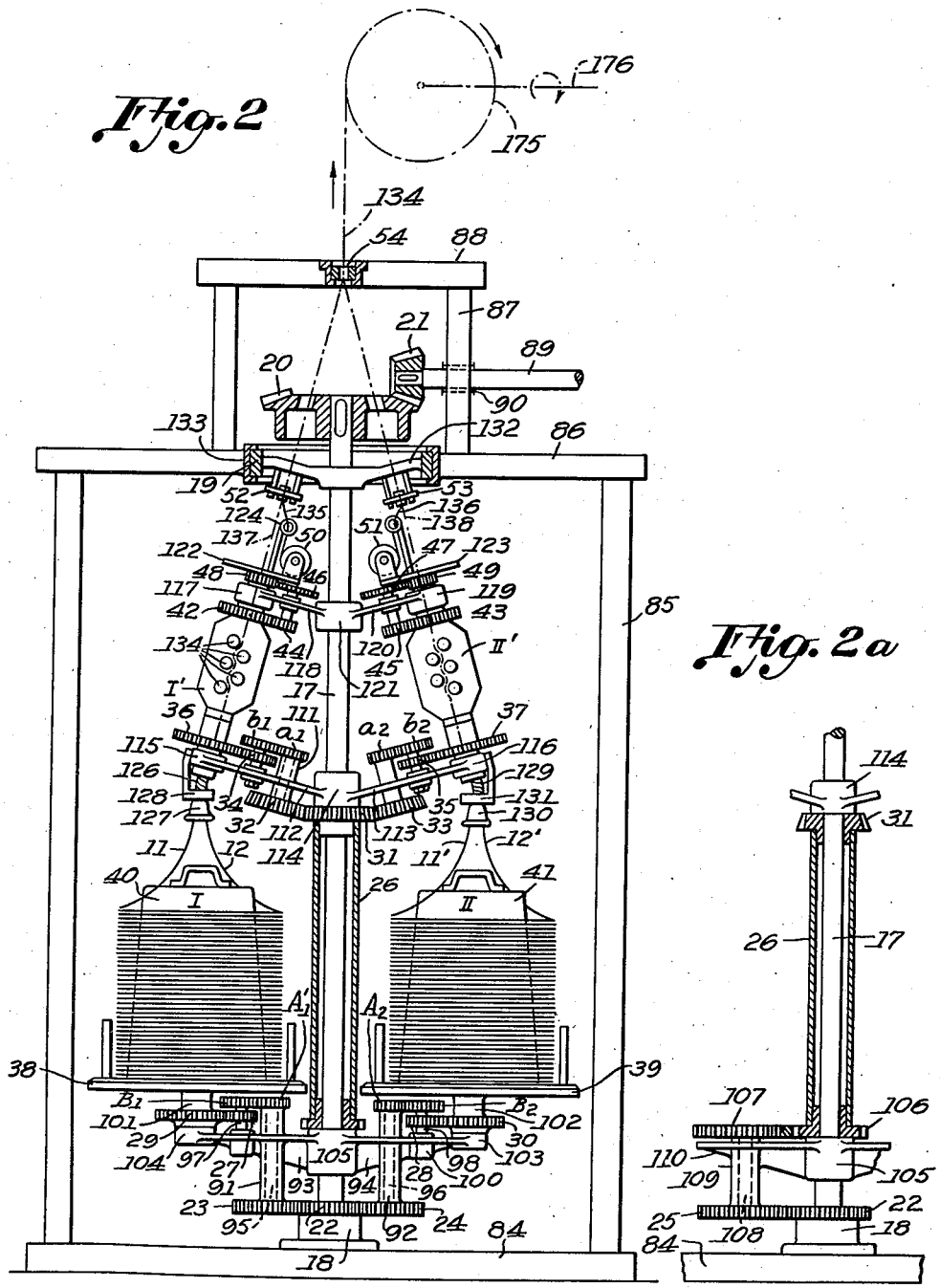

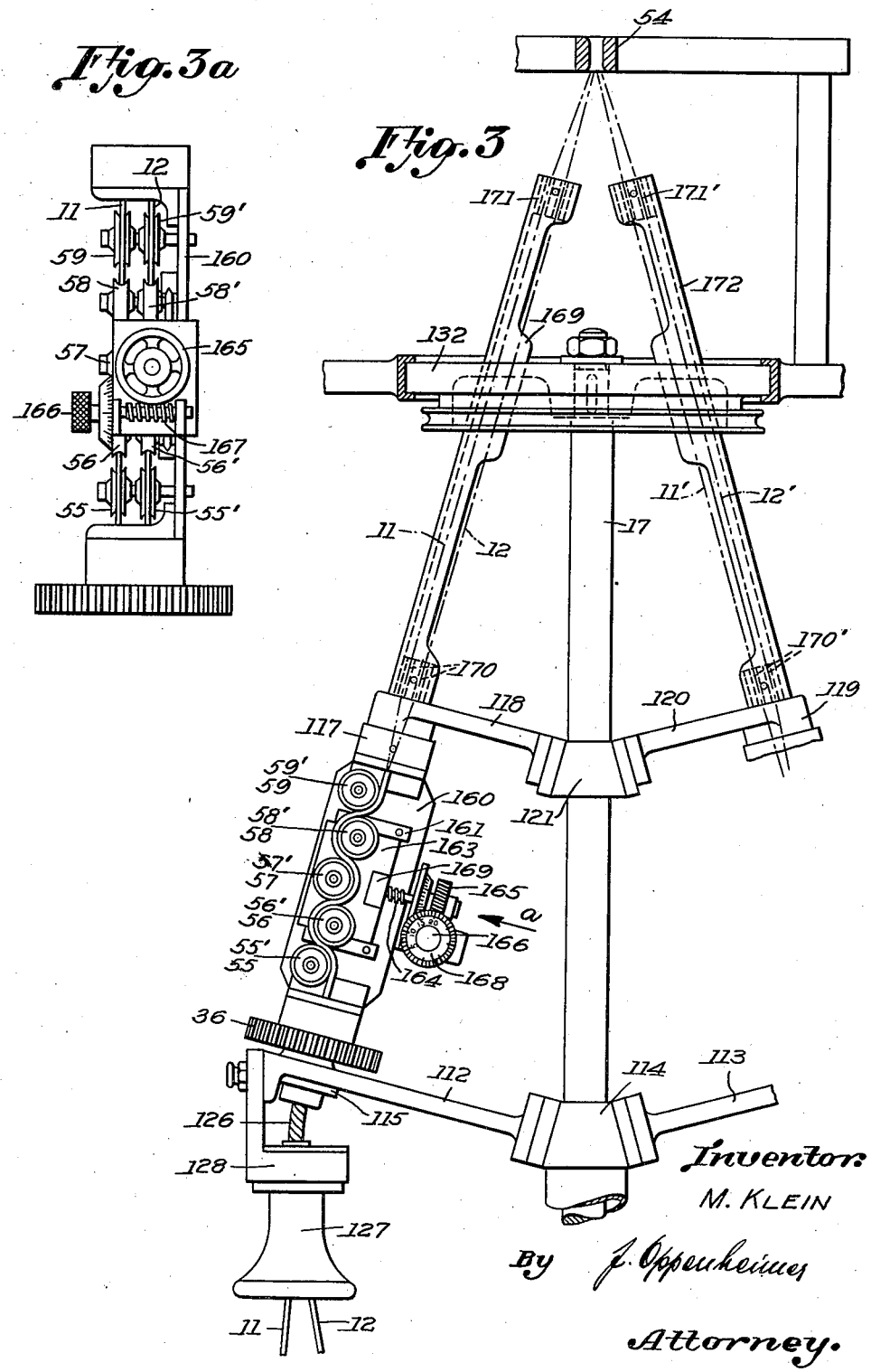

2,130,394

UNITED STATES PATENT OFFICE 2,130,394

METHOD AND APPARATUS FOR MANUFAC-
TURING ELECTRICAL CABLES

Maurus Klein, Lausanne, Switzerland

Application April 27, 1935, Serial No. 18,532
In Switzerland April 4, 1931

3 Claims. (Cl. 117—46)

This invention relates to an improvement in a method and apparatus for manufacturing electrical cables for signalling, particularly for telephone transmission purposes.

It is an object of the invention to increase the efficiency of such manufacture.

It is another object of the invention to increase the preciseness of manufacture and to equalize the capacities between the conductors forming pairs in such cables, and to unify the capacities between each two of such pairs.

These and other objects of the invention will more fully appear from the following specification.

This application forms a continuation in part of my co-pending application Serial No. 573,195, filed November 5, 1931.

In the said co-pending application the manufacture of electrical cables for telephone transmission has been described comprising pairs of twisted conductors, two such pairs being again twisted together, forming a set. Unbalances of capacities between the conductors of the pairs, and between two such pairs forming a set, are intended to be removed by my co-pending application. It has been accomplished by directly braking the conductors while twisting them into pairs, particularly by applying frictional brakes or deformation brakes on each of the conductors during the twisting operation. I preferred the use of deformation brakes because they can identically be built and equally adjusted with same accuracy, whereby applying of the same tension to each of the conductors to be twisted into a pair can be secured.

I further described in this co-pending application the way of adjusting such brakes by first making short trial lengths of the pair to be produced and investigating its qualities in order to adjust one or the other brake, if necessary, until their action is rendered equal. I further disclosed a method of securing the crossings of the twisted conductors at the proper places, such as by binding them tightly at suitable points. To eliminate any tensions in the conductors before passing the brakes, I suggested to draw the strands of the insulated conductors from loosely wound coils, particularly from cones around which the strands have been loosely wound before.

By the present invention, this method of directly braking the conductors, or the sets of conductors, to be twisted is improved. Furthermore, a cable twisting machine suitable for performing this improved method and comprising brakes acting directly on the strands, or set of strands, preferably to be unwound from loosely wound coils and to be twisted into pairs, or sets of pairs, is concerned.

The invention may be more fully described in the following specification.

In the drawings, Fig. 1 is a side elevation of a machine for winding two strands of the insulated conductors into a loosely wound coil; Fig. 2 is a side elevation, partly in cross-section, of a machine for twisting the two strands from the coils into pairs and, in the same operation, the pairs into sets, or groups; Fig. 2a shows a detail of the machine according to Fig. 2, partly in cross-section; Fig. 3 shows a somewhat altered detail of the machine according to Fig. 2; Fig. 3a shows a particular feature of brakes to be used in such a machine, seen in direction of arrow a in Fig. 3.

In Fig. 1, a cone 7 having a lower cylindrical part 8 is positioned upon a shaft 2 which is connected with a bevelled gear 10, which meshes with another bevelled gear 9 rotatably mounted on a support 78 which is mounted on a frame 6, in the upper part of which the shaft 2 is rotatably held. On the shaft 79, on the rear side of the support 78, is fixed a disc 5 driven with desired speed by a belt 3 and another disc 4 on the shaft of a motor 1. The upper end of shaft 2 may have a square cross section fitting into a correspondingly shaped hole in cone 7, so that the latter one is rotated with desired speed around its vertical axis. On the upper side of frame 6 a table 77 is fixed having a guide 80 with two holes 81, 82 through which the strands 11, 12, respectively, are drawn from suitable supply rolls 13, 14, respectively, which are exchangeably supported by a suitable frame 15.

In operation, the strands 11, 12 are drawn through the holes 81, 82 and first wound, in the way shown, helically around the cylindrical part 8 and the conical part of the cone 7, and fixed with their ends at 83 to one of the rods 16, which are removably mounted on the upper side of the cone 7. If rotating the cone around its vertical axis by means of the motor 1, the strands 11, 12 are first wound around the cylindrical part 8 of the cone 7 in a certain number of windings which, after the cylindrical part 8 has been quite tightly covered in this way by a layer of these strands, are pushed up onto the conical part 7 when continuing the winding up of the strands 11, 12, whereby the subsequent windings displace the formerly wound up windings. The so pushed up windings are now quite loosely lying around the cone 7. This operation continues until a coil of a desired number of windings has been wound. Thereupon the strands 11, 12 are cut off on their lower ends and the cone 7 is removed from the shaft 2. No such cutting off is necessary if coils are wound upon the cone 7 till the supplies 13, 14 are exhausted.

It is to be noted that by this operation no twisted pairs of strands are produced, but that a coil has been made consisting of two still entirely separate strands. One may call this a "double-coil."

In Figs. 2, 2a, 3 and 3a the identical reference numbers have the same significance.

The machine for twisting the strands into twisted pairs and thereupon into sets, or groups, comprises a base plate 84 and a frame 85, 86, 87, 88. On the base 84 a bearing 18 is mounted in which the vertical main shaft 17 of the machine is journaled, on the upper end of which a bevelled gear 20 is fixed, meshing with another bevelled gear 21 mounted on a driving shaft 89 which is journaled in a bearing 90 of the frame-part 87. Shaft 89 is driven with desired speed by a motor (not shown).

A gear 22 is fixed to the bearing 18 so that it cannot rotate. The gears 23, 24 are rotatably mounted on arms 93, 94 by means of bearings 91, 92. On the upper end of the shafts 95, 96, gears A1, A2 are mounted meshing with gears B1, B2, respectively, the shafts 97, 98 of which are journaled in bearings 99, 100, respectively. On shaft 97 a gear 27 is mounted meshing with the gear 29, while on shaft 100 a gear 28 is mounted meshing with gear 30.

Table 38 is mounted on shaft 101 and journaled in a bearing 104. Shaft 101 carries a gear 29 meshing with gear 27. Shaft 102 carries a gear 30 meshing with a gear 28. The bearings 91, 99, 104 are fixed to an arm 93; the bearings 92, 100, 103 are mounted on an arm 94. The arms 93, 94 are fixed to the sleeve 105 which in turn is fixed to the shaft 17 and rotate therefore with the shaft 17.

A sleeve 26 is rotatably mounted around the shaft 17 and connected at its lower end with a gear 106, which meshes with the gear 107 fixed on the upper end of shaft 108 which is journaled in a bearing 109 fixed on arm 110 of sleeve 105. A gear 25 is fixed on the lower end of shaft 108 and meshes with the stationary gear 22 fixed to the bearing 18. On the upper end of sleeve 26 a gear 31 is fixed. On a shaft 111 which is journaled in a bearing of arm 112 and connected with the gear 32 a gear a1 is fixed and meshes with a gear b1 which is connected by a shaft with the gear 34, which meshes with gear 36. In the same way, gear 33 is connected with gear a2 which meshes with gear b2 which is connected with a gear 35 which meshes with gear 37. The arms 112, 113 are fixed at 114 to the shaft 17. A bearing 115 is provided at the end of arm 112, and a bearing 116 on the end of arm 113. A bearing 117 is provided at the end of an arm 118, and a bearing 119 at the end of an arm 120, which are fixed at 121 to the shaft 17. Direct acting brakes, in this embodiment of the invention in the form deformation brakes I' are journaled in the bearings 115, 117, and identical brakes II' are journaled in the bearings 116, 119. The pivots of these brakes are hollow so that the strands 11, 12 and 11', 12', respectively, may enter and leave the brakes through these holes.

The gear 36 is fixed to the lower pivot of brake I' and the gear 37 is fixed to the lower pivot of brake II'. Another gear 42 is fixed on the upper end of brake I' and meshes with a gear 44, the shaft of which is journaled in the arm 118 and fixedly connected with another gear 46 which meshes with the gear 48. In the same way, gear 43 is connected with the upper end of the brake II' and meshes with the gear 45, the shaft of which is journaled in the arm 121 and fixedly connected with another gear 45 which meshes with the gear 49.

The gear 48 is journaled in the bearing 117 independently of the pivot of the brake I' and bears a table 122 which is fitted with suitable devices for lacing the twisted strands. A supply roll 50 of yarn is pivotally fixed on the table and the yarn drawn through an ear 124 around the pair of strands. In the same way, a gear 49 is pivotally mounted in the bearing 119 and bears a table 123 with lacing means 51, 125.

On the lower side of brake I' a flexible hollow shaft 126 is fixed and connected with a bell 127 which is rotatably mounted in a bracket 128 fixed on the outside of the bearing 115. With the hollow pivot of brake II' a hollow flexible shaft 129 is connected extending to a bell 130 being rotatably mounted in a bracket 131 fixed on the outside of the bearing 116.

Near the upper end of shaft 17 a wheel 19 having arms 132 is fixed. This wheel glides in a guide 133 being fixed to the upper part 86 of the machine frame. On the arms 132 the twisting guides 52, 53 are mounted.

On the upper part 88 of the frame another twisting die 54 for the set or group of strands is mounted.

In operation, two cones I, II, upon each of which a pair of strands 11, 12 and 11', 12' have been wound in the way as described in connection with Fig. 1, are positioned upon the tables 38, 39, and the rods 16 are removed. The upper ends of the strands 11, 12 are drawn through bell 127, flexible shaft 126, hollow pivot of brake I', between the rolls of the latter one, and then through the upper hollow pivot of the brake, the twisting die 52 and then through the other die 54. Said twisting dies exert the well known action upon the pair of strands passing them consisting therein that the strands are slightly pressed together and against the walls of the dies when being drawn through them whereby friction is caused between the strands and the walls of the dies sufficient to prevent the strands from substantially rotating within the dies and around each other. The deformation brake I' comprises several rolls 134, each of them having two circumferential grooves in which the strands 11, 12 are positioned and deformed, so as to exercise upon them the intended brake action. The two strands are then twisted around each other by the die 52. In same way, the strands 11', 12' are drawn from the cone 41 into the bell 130, through the hollow flexible shaft 129 and the hollow pivot of brake II' between the rolls of it and then through the hollow die 53 and twisted thereby around each other.

The strands being drawn off loosely wound coils 40, 41, a negligible tension exists in them when entering the deformation brakes, the action of which determines therefore substantially the tension in the strands which are absolutely equal inter se, and therefore also an equal and uniform twisting results with surprisingly small unbalances of the capacities of the pairs of insulated wires. Two pairs of strands of such quality being then twisted into a set, or group, at the die 54, it appears therefrom that also the set will be of highest uniformity. It is to be understood that such set 134 is then drawn in the well known way upon a roll which is driven so as to apply the wanted tension upon all the strands to be combined in the group, or set.

The shaft 89 rotates the shaft 17 in a wanted direction with the wanted number of turns per minute. Consequently, the tables 38, 39 with the cones I, II, furthermore the brakes I', II' and the lacing devices 50, 124, 52 and 51, 125, 53, respectively, are rotated with the same speed by the shaft 17.

At the same time, the strands are drawn from the coils. While unwinding the coils, each strand would be twisted once around its own axis if one winding is drawn off from the coil. Therefore each coil has to be rotated around its own axis so that it makes one turn while one winding is drawn off from it, and in such a sense that this twisting of the strand is avoided. Thereby the point of drawing off the strand from the coil virtually remains at the same place relative to the rotating shaft. This well known so-called "back rotation" is achieved by the gears 23, A1, B1, 27, 29 and 24, A2, B2, 28, 30, respectively, which are moved accordingly as the tables 38, 39 on the arms 93, 94 are rotated by the shaft 17 and the gears 23, 24 are therefore rolled off the stationary gear 22. These gears may be exchangeable in order to take care of different average diameters of the coils. By properly dimensioning these gears also another result is obtained, as to twisting the strands 11, 12 and 11', 12' passing the brakes I', II'. These brakes are rotated around their own axis by the gears 32, a1, b1, 34, 36 and 33, a2, b2, 35, 37, respectively. By exchanging gears A1, B1, a1, b1, A2, B2, a2, b2, different speeds of the brakes relative to the coils are obtained. Supposed that the strands are drawn through the brakes with the same speed, by increasing the relative speed of rotation of the brakes also the number of twists per unit of lengths of the twisted pair is increased, and vice versa.

The gears A1, B1, and A2, B2 may be dimensioned so that the place from which the strands are drawn off the coils retains its position relatively to the plane of the co-ordinated brake during rotation of the latter one. Let me take, for example, that the brakes are making 100 turns during a minute, and that ten windings are drawn off per minute from the coils, then the coil has to make 110, or 90, turns per minute, as the case may be, and the gears referred to are suitable to be dimensioned. Consequently, the pair of strands passing from the brake 134 through the die 52 will be twisted 100 times. Supposing that the shaft 17 makes 60 turns per minute, the pairs of strands passing from the die 52 to the die 54 will be twisted 60 times. But any other relation of the speeds of these rotations may be accomplished provided that the above described synchronization between drawing off the strands from a loose double coil and rotation of a coordinated brake around its own axis is maintained and thereby any twist otherwise put into the pair of strands on its way from the double coil to the brake, is compensated.

The brakes rotate the strands, passing them in parallel, around the longitudinal axis of the brake, whereby the strands are twisted in passing to the die 52. On the way to the die, a yarn 135 may be twisted around the twisted pair of strands in order to fix their places of crossings.

The yarn is drawn from a spool 50 rotatably mounted on the table 122. In order to twist this yarn 135 around the pair of strands, the spool 50 and the ear 124 are to be rotated around the pair of strands, and this is achieved by means of the gears 48, 46, 44, 42, the latter one being fixed to the brakes, the first one to the table 122. In the same way, a yarn 136 may be twisted around the other pair of strands leaving the brake II'; the yarn is drawn off from the spool 51, and the table 122 is rotated by the gears 49, 47, 45, 43.

The thus equally twisted pairs of strands 137, 138 now pass the die 54 wherein the pairs are twisted into a group due to rotation of the shaft 17 with the dies 52, 53 and due to the drawing off of the strands 139 by a roll 175, diagrammatically shown in dotted lines, which is driven by a shaft 176, shown in the same way, in the direction of the arrow.

In order to adjust the speed of rotation of the brakes, also the gears 25, 107 may be suitably chosen. Gear 25 is driven by the stationary gear 22.

By varying the speed of the shaft 71 and the speed of drawing off the four strands 134, the number of twists in the group per unit of length can be adjusted.

The pair of strands may also be drawn through brakes having rolls 180 with only one groove each. Both strands are then passing the same groove, and the twisting is already done at the point where the strands enter the brake. If, however, the twisting is to be done after the strands have passed the brakes, then the rolls may be arranged as shown in Figs. 3, 3a. On a plate 160 pairs of grooved rolls 55, 55'; 56, 56'; 57, 57'; 58, 58', 59, 59' are pivotally mounted and the strands 11, 12 separately drawn over the rolls 55, 56, 57, 58, 59 and 55', 56', 57', 58', 59', respectively. The deformation and thereby the action of the brake may be adjusted at a desired degree by turning the gear 165 by means of the worm 167 and handle 166. A dial 168 may be provided in order to facilitate the equal adjustment of the various brakes (in this exemplification two). If rotating the gear 165 the screw 164 is rotated within a nut 169 provided on the slide 163, which is slidably held in guides 161, 162 of the plate 160 and pivotally bears the three middle pairs of rolls. By moving this slide 163 to the left in the drawings, the deformation of the strands will be increased and thereby the braking action upon them. The thus twisted pairs of strands are then led through the guides 170, 171 in the table 169 which is fixed to one of the arms 132, and they are then twisted together with the strands 11', 12' passing the guides 170', 171' of the tube 172 into a group, or set, by means of the disc 54.

It is to be understood that by increasing the number of brakes and cones, three and more pairs of insulated conductors (strands) can be twisted together and into groups of any desired higher order. Such groups may be used in a star—or in a phantom—or any other usual or suitable electrical connection for telephone and other transmission of signals, sounds, talks, or the like.

In the embodiment of the invention according to Figs. 3, 3a no twisting around of yarn is necessary, and it may also be omitted in the other exemplification of the invention shown in Fig. 2.

According to the invention, two twists, of pairs and of groups, are performed in one operation with greatest accuracy and symmetrical distribution of capacities, using a single adjusting means (brakes) and adjusting operation. The manufactured groups are, furthermore, very strong.

It is to be understood that the invention is not limited to the exemplification shown but is described in its broadest aspect by the appended claims.

What I claim is:

1. An apparatus for twisting into pairs strands of insulated electrical conductors drawn through it and such pairs into groups, comprising a number of supporting means for coils of loosely wound untwisted pairs of said strands; a number of adjustable deformation brakes each adapted to act directly and simultaneously upon a pair of said strands, means for adjusting each of said brakes, and means for rotating each of said brakes around its own axis substantially coinciding with the direction of travel of said strands through the brake; a first twisting die stationary arranged in the path of all said strands; a number of second twisting dies, a second twisting die each arranged in the path of a pair each of said strands from a brake to said first twisting die, the numbers of said supporting means, said brakes and said second twisting dies being equal; means for rotating said supporting means, said brakes and said second twisting dies with equal speed around a common axis; and means for back-rotating said supporting means relative to said brakes rotating around their own axis, so that untwisted loose pairs of strands under no tension are delivered to said brakes; thereby each pair of said strands being twisted on its way from a brake to a second twisting die, and the twisted pairs so obtained being twisted into groups when passing said first twisting die.

2. In an apparatus as described in claim 1, said means for rotating said supporting means, said brakes and said second twisting dies around a common axis being exchangeable.

3. A method of manufacturing twisted groups of a plurality of twisted pairs of strands of insulated electrical conductors, comprising the steps of winding pairs of parallel strands into loosely wound coils, drawing said pairs off from said coils and simultaneously back-rotating said coils, introducing a still untwisted pair each of loose strands into a directly acting brake each, rotating with equal speeds each of said brakes around its own axis substantially coinciding with the direction of travel of said strands through said brake, drawing said pairs from said brakes through individual twisting dies stationary arranged relative to said brakes, thereby twisting said pairs of strands, rotating said brakes and said twisting dies simultaneously and with equal speed around a common axis, drawing said twisted pairs through a common stationary twisting die and twisting thereby said pairs into groups.

MAURUS KLEIN.